US008761811B2

(12) United States Patent
Alonzo

(10) Patent No.: US 8,761,811 B2
(45) Date of Patent: Jun. 24, 2014

(54) AUGMENTED REALITY FOR MAINTENANCE MANAGEMENT, ASSET MANAGEMENT, OR REAL ESTATE MANAGEMENT

(75) Inventor: Jason Alonzo, Fair Oaks, CA (US)

(73) Assignee: Oracle International Corporation, Redwood Shores, CA (US)

(*) Notice: Subject to any disclaimer, the term of this patent is extended or adjusted under 35 U.S.C. 154(b) by 140 days.

(21) Appl. No.: 13/458,870

(22) Filed: Apr. 27, 2012

(65) Prior Publication Data
US 2013/0288719 A1 Oct. 31, 2013

(51) Int. Cl.
*H04W 24/00* (2009.01)
*H04B 1/38* (2006.01)

(52) U.S. Cl.
USPC ............................ 455/457; 455/566; 345/158

(58) Field of Classification Search
None
See application file for complete search history.

(56) References Cited

U.S. PATENT DOCUMENTS

| 7,372,451 | B2 * | 5/2008 | Dempski ..................... 345/158 |
| 7,538,724 | B1 | 5/2009 | Baillot |
| 2004/0105427 | A1 | 6/2004 | Friedrich et al. |
| 2009/0182600 | A1 | 7/2009 | Lungu |
| 2009/0318126 | A1 | 12/2009 | Schimitzek |
| 2012/0206129 | A1 * | 8/2012 | Mahan et al. ................. 324/202 |
| 2012/0324213 | A1 * | 12/2012 | Ho et al. ...................... 713/100 |

OTHER PUBLICATIONS

Augment Reality for the Enterprise—SAP Employee Unveils Prototype; obtained at http://www.readwriteweb.com/enterprise/2010/07/enterprise-augment-reality-sap.php; 2 pages; Jul. 27, 2010.
IFS—From Green Screens to User-Centric ERP; obtained at http://www2.ifsworld.com/innovation/web/Content/pdf/en/IFSUpdate_FutureTrendsInERP.pdf; 2 pages; document downloaded Jan. 2012.
AmbiSense; obtained at http://translate.google.co.in/translate?hl=en&sl=de&u=http://www.uni-tuebingen.de/fakultaeten/mathematisch-naturwissenschaftliche-fakultaet/fachbereiche/informatik/forschung/forschungsprojekt-ambisense.html&ei=_ZkPT6OvNcXIrQflio3-AQ&sa=X&oi=translate&ct=result&resnum=10&ved=0CHQQ7gEwCQ&prev=/search%3Fq%3Daugmented%2Breality%2Berp%26hl%3Den%26biw%3D1619%26bih%3D702%26prmd%3Dimvns; 2 pages; Apr. 10, 2012.
The Layar Reality Browser; obtained at http://www.layar.com/browser/; 1page; Jan. 13, 2012.
Augmented Reality Browser API; obtained at http://www.readwriteweb.com/archives/wikitude_breaks_from_the_pack_releases_augmented_r.php; 2 pages; Jan. 13, 2012.

(Continued)

*Primary Examiner* — Erika A Washington
(74) *Attorney, Agent, or Firm* — Trellis IP Law Group, PC

(57) ABSTRACT

A system and method for facilitating employing augmented reality in an enterprise computing environment. The example method includes receiving one or more inputs characterizing an environment of a mobile computing device employed by a user and providing a signal in response thereto. A display screen of the mobile computing device is then selectively augmented with one or more user interface controls based on the signal. A first user option provided via the one or more user interface controls enables a user to interact with a computing object that includes enterprise data associated with the user. In a specific embodiment, the method further includes providing a second user option, via the one or more user interface controls, to sequence a set of tasks to be performed by the user.

19 Claims, 18 Drawing Sheets

(56) References Cited

OTHER PUBLICATIONS

Mobile 2.0 Solutions; obtained at http://www.globalsinc.com/mobile-2-0-solutions/; 2 pages; Jan. 13, 2012.

Wikitude World Browser; obtained at http://en.wikipedia.org/wiki/File:Wikitude_World_Browser_@Salzburg_Old_Town.jpg; 2 pages; Apr. 10, 2012.

Google Goggles; obtained at http://en.wikipedia.org/wiki/Google_Goggles; 3 pages; Apr. 10, 2012.

* cited by examiner

AUGMENTED REALITY FOR MAINTENANCE MANAGEMENT, ASSET MANAGEMENT, OR REAL ESTATE MANAGEMENT

BACKGROUND

The present application relates to software, and more specifically to mobile enterprise software and associated methods that leverage data collected via a mobile computing device.

Mobile enterprise software is employed in various demanding applications, including maintenance management, asset management, and real estate management. Such applications demand user friendly software that can save time and enhance productivity of mobile users.

Conventional mobile enterprise software applications provide limited access to Enterprise Resource Planning (ERP) data and functionality. Certain mobile enterprise software running on a mobile computing device, such as a smartphone, may enable users limited access to Enterprise Resource Planning (ERP) data stored on a remotely accessible server or cloud. A user may employ a keypad, touch screen, and/or voice input on a smartphone to access, for example, open work orders applicable to the user.

However, such mobile enterprise applications typically do not alleviate the need for mobile workers to carry supplemental information, such as books or manuals, paperwork describing a work order, map of a corporate campus detailing a location of a work order, and so on. Carrying maps, manuals, and or other papers can be cumbersome and inefficient. Furthermore, use of conventional mobile enterprise software to navigate complicated ERP user interfaces to access other potentially relevant information, such as work orders and associated information, can be inefficient.

To facilitate mobile access to enterprise related data, certain mobile enterprise software may employ Quick Response (QR) codes. For example, mobile asset management software may provide features for scanning Quick Response (QR) codes attached to an asset to obtain information pertaining to the asset. However, such software typically does not, for example, alleviate the need for workers to carry a map of a corporate campus to locate the asset or to carry information pertaining to an applicable work order.

SUMMARY

An example method employs augmented reality in an enterprise computing environment. The example method includes receiving one or more inputs characterizing an environment of a mobile computing device employed by a user and providing a signal in response thereto; selectively augmenting a display screen of the mobile computing device with one or more user interface controls based on the signal; and providing a first user option, via the one or more user interface controls, to interact with a computing object that includes enterprise data associated with the user.

In a specific embodiment, the method further includes providing a second user option, via the one or more user interface controls, to sequence a set of tasks to be performed by the user. The set of tasks may include, for example, traveling to a location of a work order and performing the work order. The set of tasks may also include multiple work orders slated to be performed by the user in a particular order.

The step of receiving further includes receiving location-identification information characterizing a location of the mobile computing device and orientation information characterizing an orientation of the mobile computing device. The location information and orientation may be obtained via one or more devices included with the mobile computing device, such as a Global Positioning System (GPS) receiver, compass, gyroscope, accelerometer, camera, and so on.

In the specific embodiment, the example method further includes using location information and orientation information to track movement of a user in an environment and augmenting a display of the mobile computing device with directions to a particular location associated with one or more tasks of the set of tasks based on a current position of the user in the environment.

The step of receiving further includes receiving image information via a camera of the mobile computing device. One or more images included in the image information are matched with previously stored image information to facilitate identifying an entity, such as a building, marker, Quick Response code, and so on, in an environment surrounding a user of the mobile computing device. The location and orientation of the mobile computing device is further refined based on a known location and position of the entity relative to the surrounding environment.

The example method further includes overlaying a first user interface control on the one or more images, wherein the user interface control is adapted to enable a user to access a computing object associated with a particular task or project, such as a work order. An additional user option enables a user to adjust stored data associated with the work order. For example, a user option to adjust a status of the worker order may be provided.

The example method further includes positioning the first user interface control on an image displayed via the mobile computing device at a portion of the image corresponding to a location at which the work order is to be performed. The image may include, for example, an image of a building at which one or more work orders are to be addressed. The first user interface control may be overlaid on the image of the building at a specific floor corresponding to the location at which the work order is to be performed. Another user option enables a user to display one or more tasks of the set of tasks on a map characterizing a location of a user of the mobile computing device.

Hence, certain embodiments discussed herein facilitate employing information captured by a mobile computing device, such as location, imagery, device orientation, and so on, to provide access to pertinent enterprise data and functionality tailored to the user. The data may include information, e.g., manuals, asset descriptions, and so on, pertaining to work orders, assets, and so on. The functionality may include providing directions to a specific location; adjusting the information or status of the information; sequencing tasks to be completed, and visually displaying user interface controls with identification information and location information on imagery obtained via the mobile computing device; displaying representations of (e.g., user interface controls corresponding to) tasks to be completed on an overview map, and so on.

A further understanding of the nature and the advantages of particular embodiments disclosed herein may be realized by reference of the remaining portions of the specification and the attached drawings.

DETAILED DESCRIPTION OF EMBODIMENTS

Figure 1:
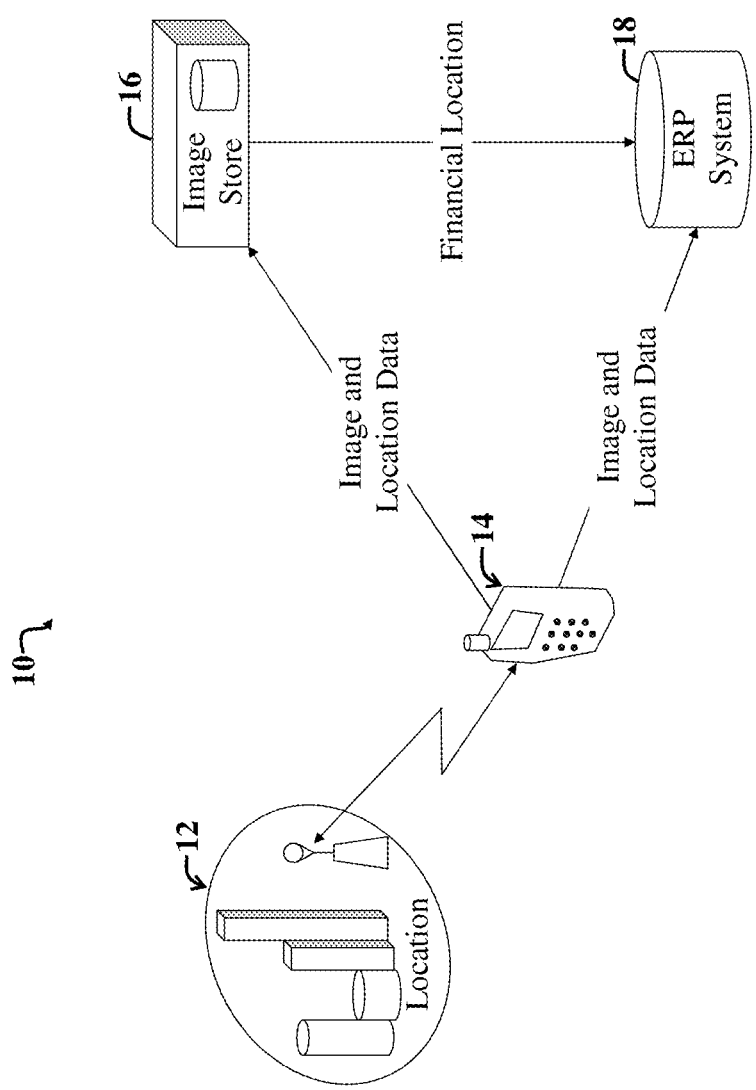
FIG. 1 is a diagram illustrating an example enterprise computing environment and accompanying system for employing augmented reality to facilitate interacting with an Enterprise Resource Planning (ERP) system and performing associated tasks.

Although the description has been described with respect to particular embodiments thereof, these particular embodiments are merely illustrative, and not restrictive.

For example, while the present application is discussed with respect to systems and methods for overlaying data and user interface controls on live video information as seen through the camera of a mobile computing device (also called mobile device), embodiments are not limited thereto. For example a still photograph taken by a user may be augmented with Enterprise Resource Planning (ERP) related data (also called enterprise data) without departing from the scope of the present teachings.

For the purposes of the present discussion, enterprise data may be any information pertaining to an organization or business, including information about projects, tasks, resources, orders, and so on. Examples of enterprise data include descriptions of work orders, asset descriptions, photographs, and so on.

A mobile computing device may be any computer that is adapted for portable use. A computer may be any processor coupled to memory. Examples of mobile computing devices include laptops, notebook computers, smartphones and tablets (e.g., iPhone, iPad, Galaxy Tab, Windows Mobile smartphones, Windows 7 smartphones and tablets, Android smartphones tablets, Blackberry smartphones, and so on), and so on. Various specific example embodiments discussed herein employ a mobile computing device further equipped with a camera, a network connection, Global Positioning System (GPS) receiver, gyroscope, compass, and user input functionality, such as a touch screen and/or or qwerty keypad.

An enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, and so on.

An enterprise computing environment may be any computing environment used for an enterprise. A computing environment may be may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

ERP software may be any set of computer code that is adapted to facilitate managing resources, projects, and/or tasks of an organization. Example resources include Human Resources (HR), financial resources, assets, employees, and so on, of an enterprise. The terms "ERP software" and "ERP application" may be employed interchangeably herein. However, an ERP application may include one or more ERP software modules or components, such as user interface software modules or components. An ERP system may be any infrastructure, i.e., resources, such as hardware and ERP software, used to facilitate managing resources of an organization.

Enterprise software applications, such as Customer Relationship Management (CRM), Business Intelligence (BI), Enterprise Resource Planning (ERP), asset management, maintenance management, real estate management, and project management software, often include databases with various database objects, also called data objects or entities. A database object, also called a computing object herein, may be any collection of data and/or functionality, such as data pertaining to a particular financial account, asset, employee, contact, and so on. Examples of computing objects include, but are not limited to, records, tables, or other database entities corresponding to accounts receivables, products, employees, customers, business resources, and so on. Examples of functionality that may be included in a computing object include executable code; calls to programming language functions, procedures and/or scripts; hyperlinks, computer instructions for generating user interface controls, and so on.

For clarity, certain well-known components, such as hard drives, processors, operating systems, power supplies, and so on, have been omitted from the figures. However, those skilled in the art with access to the present teachings will know which components to implement and how to implement them to meet the needs of a given implementation.

FIG. 1 is a diagram illustrating an example enterprise computing environment and accompanying system 10 for employing augmented reality to facilitate interacting with an Enterprise Resource Planning (ERP) system 18 and performing associated tasks.

For the purposes of the present discussion, augmented reality may refer to any view of an environment that is augmented with data. For example, camera imagery viewed through a smartphone may be augmented with computer-supplied data, such as location identifiers, hyperlinks, bubbles, icons, and other user interface controls and information overlaid on the imagery. Augmented reality may also refer to data that is augmented with imagery characterizing one's surroundings.

A user interface control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on.

Imagery may be augmented via one or more layers of data and/or user interface controls. In various embodiments discussed herein, user interface controls used to augment imagery, as seen through a camera of a mobile computing device, may facilitate access to additional information, such as data maintained via the ERP system 18 and accompanying image store 16, and/or may facilitate interaction with data and/or functionality maintained locally on a mobile computing device 14 and/or maintained remotely on a server, such as an ERP server system 18. The ERP system 18 may run various ERP applications, such as maintenance management, real estate management, and asset management applications, on a cloud server. A cloud server may be any remotely accessible server that provides functionality, such as server-side applications and/or data that may be accessed remotely, such as via the mobile device 14.

The example system 10 of FIG. 1 includes the mobile computing device (also called mobile device) 14 in communication with the remote ERP server system 18 and image store 16. Note that while the image store 16 and ERP server system 18 are shown separately from the mobile device 14, certain ERP applications and image data may be stored locally on the mobile device 14, without departing from the scope of the present teachings. For example, the mobile device 14 may maintain a local image store and may run stand-alone a standalone ERP application that does not require communication with a remote image store or ERP server. Furthermore, while the image store 16 is shown separately from the ERP system 18, the image store 16 may be included in the ERP server 18, without departing from the scope of the present teachings.

In operation, the mobile device 14 may obtain data about environmental features 12, such as via a Global Positioning System (GPS) receiver, camera, gyroscope, compass, and so on. The collected information may be employed by software running on the mobile device 14 and/or ERP server system 18 to resolve a financial location of the mobile device 14.

For the purposes of the present discussion, a financial location may refer to any physical location that is associated with one or more attributes, wherein the one or more attributes include enterprise data. The enterprise data may be included in a computing object associated with a particular location. For example, the data may indicate that the environmental features 12 include corporate buildings in which pending work orders are to be completed.

Hence, GPS coordinates, altitude, orientation, visual image information, and/or other location-identification information from the mobile device 14 is used in combination with image data in the image store 16 (either locally on the mobile device 14 or remotely based) to resolve a financial location of the mobile device 14. Alternately, in certain implementations, the ERP system 18 may effectively resolve a financial location of the mobile device 14 with merely GPS data from the mobile device 14 and information already present in an ERP assets module, as discussed more fully below.

For the purposes of the present discussion, location-identification information may be any data usable to identify a location or approximate location. Examples of location-identification information include addresses, GPS coordinates, image data that has been associated with GPS coordinates or specific locations, and so on.

Figure 2:
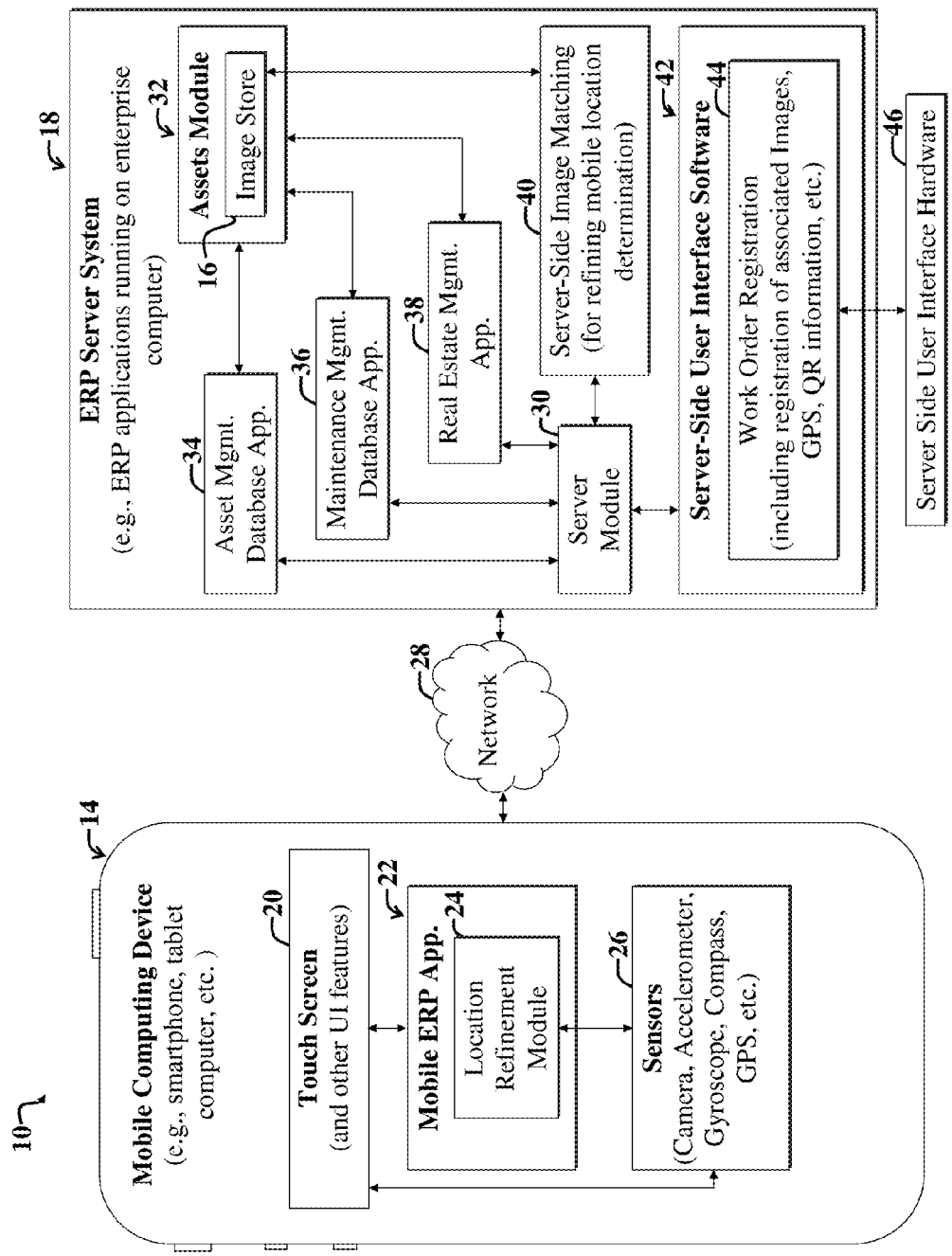
FIG. 2 is a more detailed diagram illustrating an example implementation of the system of FIG. 1.

FIG. 2 is a more detailed diagram illustrating an example implementation of the system 10 of FIG. 1. The mobile device 14 is shown communicating with the ERP server system 18 (which may be implemented via one or more computers) via a network 28, such as the Internet.

The example mobile device 14 includes a mobile ERP application 12 running a location refinement module 24. The location refinement module 24 communicates with sensors 26. The sensors 26 may include a camera, accelerometer, gyroscope, compass, GPS receiver, and so on. Note that mobile devices that lack one or more sensors may be employed to implement certain embodiments, without departing from the scope of the present teachings. The mobile ERP application 22 and sensors 26 may communicate with additional user input devices and/or software and associated functionality, such as the touch screen 20.

The ERP computer 18 includes a server module 30 in communication with server-side user interface software 42, a server-side image matching module 40, a real estate management application 38, a maintenance management application 36, and an asset management application 34. The various server-side applications and modules 34-40 may communicate with an assets module 32, which accommodates the image store 16. Server-side user interface hardware 46, such as a mouse, keyboard, monitor, and so on, communicates with the server-side user interface software 42.

In the present example embodiment, the server-side user interface software 42 includes a work order registration module 44, which includes computer code, i.e., instructions for facilitating registering or associating particular work orders with images of various environmental features (e.g., buildings, assets), particular GPS coordinates, Quick Response (QR) codes, and so on. Registered imagery may be further associated with address information, floor, cubicle, and so on, associated with a work order, asset, or other enterprise resource.

Note that various modules of the mobile device 14 and ERP server system 18 may be combined or separated into additional modules, without departing from the scope of the present teachings. For example, the work order registration module 44 and associated computer code may be included in the maintenance management application 36. Furthermore, each application, e.g., maintenance management application 34, asset management application 36, and so on, may include separate user interface functionality that may be accessed without employing the server-side user interface software 42.

In a first example operative scenario, a user of the mobile device 14 employs the camera (included among the sensors 26) to view a surrounding environment, such as a corporate campus. Image information from the camera, in addition to GPS coordinates, orientation information from a compass and gyroscope, and so on, is input to the location refinement module 24. The location refinement module 24 runs computer code, which may include image matching functions, to match data provided by the sensors 26 to a known location. The mobile ERP application 22 may employ the determined location and orientation of the mobile device 14 to augment a scene viewed on the touch screen 20 with information about surround buildings or other assets; with information depicting locations associated with pending work orders; with directions to a specific location associated with a work order, and so on. The information and/or access to the information may be overlaid on the scene of the touch screen 20 via one or more user interface controls, such as bubbles, icons, and so on. The overlaid information and functionality may be included in a computing object that is associated with the determined location of the mobile computing device.

In the present example operative scenario, the mobile ERP application 22 has been preloaded with data pertaining to pending work orders to be completed or addressed by a user of the mobile device 14. Accordingly, when the user pans the camera of the mobile device 14 to view a building in which the work order is to be addressed, one or more icons are overlaid on the imagery identifying specific locations of the work order, including which floor of the building is associated with the work order, as discussed more fully below.

Note that while the present example operative scenario discusses a client-side implementation, that server-side implementations are possible. Furthermore, implementations involving a combination of server-side and client-side computing may be employed. For example, the mobile ERP application 22 may include computer code for communicating with the ERP server system 18 via the network 28 and the server module 30 of the ERP server system 18. The server module 30 may include computer code for enabling a user of the mobile device 14 to browse and use one or more of the server-side applications and/or modules 32-40. For example, an image taken by the camera of the mobile device 14 may be forwarded to the server-side image matching module 40, which may then match the image with images in the image store 16 to facilitate determining which asset is in view of the camera mobile device 14 to thereby further refine the location and orientation of the mobile device 14.

Furthermore, GPS coordinates and orientation information, e.g., from a compass may be forwarded to the server-side image matching module 40 to facilitate indexing an image search performed via the server-side image matching module 40. Alternatively, image matching functions are performed on the mobile ERP application 22, which may selectively access the image store 16 to confirm and/or refine location and orientation determinations.

The mobile ERP application 22 and/or applications 34-38 of the ERP server system 18 may include computer code for performing various additional functions and for providing various user options, as discussed more fully below.

For example, in one operative scenario, a user interface control is provided via the touch screen 20 to enable a user to sequence a set of tasks to be performed in a given region near the user. A set of tasks to be performed by a user is said to be sequenced if the tasks are slated to be performed in a particular order. For example, if a first task is scheduled to be completed before a second task, the first and second task are said to be sequenced.

The system 10 is adapted to employ a combination of marker-based and location-based augmented reality to facilitate enterprise-related tasks and data retrieval, but is not limited thereto. Marker-based augmented reality involves use of markers, such as QR codes, in a user's environment to augment a displayed scene with information associated with the marker. Location-based augmented reality involves use of location and/or orientation information to determine and retrieve data pertaining to the determined location.

For example, the system 10 may employ the location refinement module 24 and/or the server-side image matching module 40, to process imagery to identify certain environmental features or markers, e.g., building number, particular building edges or corners, QR codes, and so on, to enhance location determination precision.

Selectively employing both location data and environmental markers to facilitate interacting with an ERP system may facilitate sequencing tasks; viewing the context of work based on a user's surroundings without the need to provide keyed input; and displaying bubbles, wrenches or other user interface controls for accessing and/or interacting with associated ERP data. For example, manuals associated with a work order can be readily viewed in response to selection of an associated user interface control; status of work orders may be adjusted, and so on.

Furthermore, the information provided via the touch screen 20 may include login functionality to authenticate and identify a user and to adjust what data is displayed in response thereto. Hence, data that is particularly pertinent to, applicable to, and/or otherwise associated with the user of the mobile device 14 may be displayed. The data may be encapsulated in one or more computing objects that include associated functionality. The login functionality, as may be implemented via the mobile ERP application 22, represents a mechanism to authenticate a user and provide a signal in response thereto. The signal is then employed by the ERP application 22 and/or one or more applications running on the ERP server system 18, to select data and functionality accessible to the mobile user. Hence, in the present example embodiment, work orders and associated information accessible to a user of the mobile device 14 would be limited to work orders that have been assigned to the user.

Hence location information pertaining to the mobile device 14 may facilitate identifying an ERP asset, work order, or other resource, which is associated with a particular computing object. The user of the mobile device 14 may then interface with ERP data and employ one or more functions associated with the data, wherein the data is applicable to a user.

The system 10 may provide multiple ways to leverage augmented reality to manage assets, facilities and perform maintenance on those assets. As mobile devices become more advanced, specifically with higher resolution cameras and displays, GPS receivers, and gyroscopes, they can be used to capture and display details about the user's environment. The GPS can identify location, the gyroscope and compass can identify orientation, and the camera can be used to capture images that can be mapped to objects. As these devices proliferate, existing ERP software can be extended on to the mobile devices that leverage this information in accordance with various embodiments discussed herein.

Figure 3:
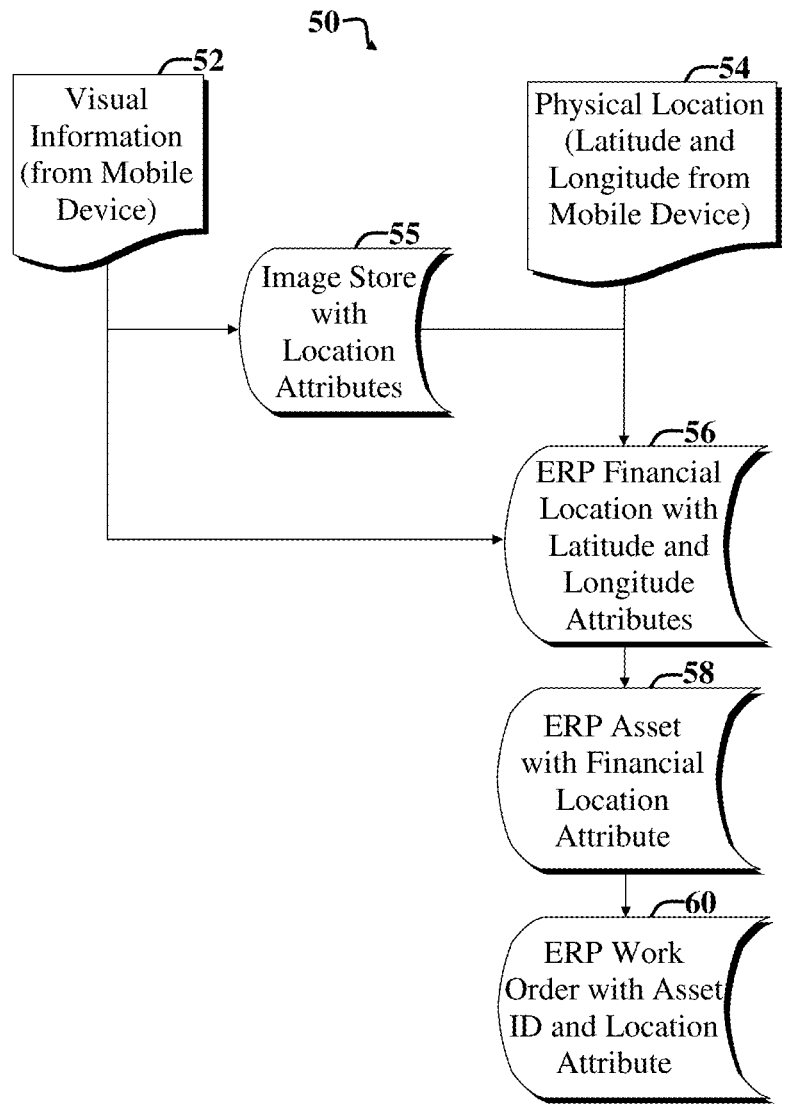
FIG. 3 is a diagram illustrating an example process flow that may be employed by the systems of FIGS. 1 and 2.

FIG. 3 is a diagram illustrating an example information process flow 50 that may be employed by the systems 10 of FIGS. 1 and 2. With reference to FIGS. 2 and 3, visual information 52 from the mobile device 14 may flow to an image store 55, which stores image information along with location attributes. The image store 55 may be employed to match the visual information 52 with stored imagery and associated location attributes.

The location attributes describe a location, such as via GPS coordinates or other descriptive parameters and information, associated with each image. Physical location information pertaining to the location of the mobile device 14 and origin of the visual information 52 may be combined with image information and associated location attributes derived via the image store 55 and the visual information 52. The combined information is used to facilitate determining an ERP financial location computing object 56 associated with an environment of the mobile device 14.

The ERP financial location computing object 56 may include one or more location attributes, such as GPS coordinates (e.g., latitude, longitude, and altitude). The ERP financial location computing object 56 is employed to determine an ERP asset computing object 58, which may identify one or more ERP assets and associated location in a vicinity of the determined financial location. The ERP asset computing object 58 may also be associated with one or more location attributes.

Information, such as image information, about a pertinent ERP asset, such as a vehicle upon or building within which work is to be performed, can be employed, e.g. via the mobile ERP application 22 and/or modules of the ERP server system 18, to determine one or more ERP work orders 60 that are associated with the ERP asset computing object 58.

Hence information employed by the systems 10 of FIGS. 1 and 2 may follow the process 50 to resolve a user's financial location and any work orders (or other ERP related tasks or sequences of tasks) associated with both the user and the financial location.

Note that certain elements of the process 50 may be omitted, rearranged, or augmented without departing from the scope of the present teachings. For example, certain implementations may not necessarily use the image store 55. Hence, use of the image store 55 of FIGS. 3 and 16 of FIGS. 1 and 2 may be optional.

The following FIGS. 1-17 illustrate an example sequence of user interface display screens that may appear on the touch screen 20 of the mobile device of FIG. 2 for a particular example operative scenario. The example operative scenario may involve a field worker (called the user), such as an engineer, that wishes to locate one or more specific buildings within a campus of buildings of a corporate headquarters and perform maintenance associated with various work orders that have been assigned to him or her.

Figure 4:
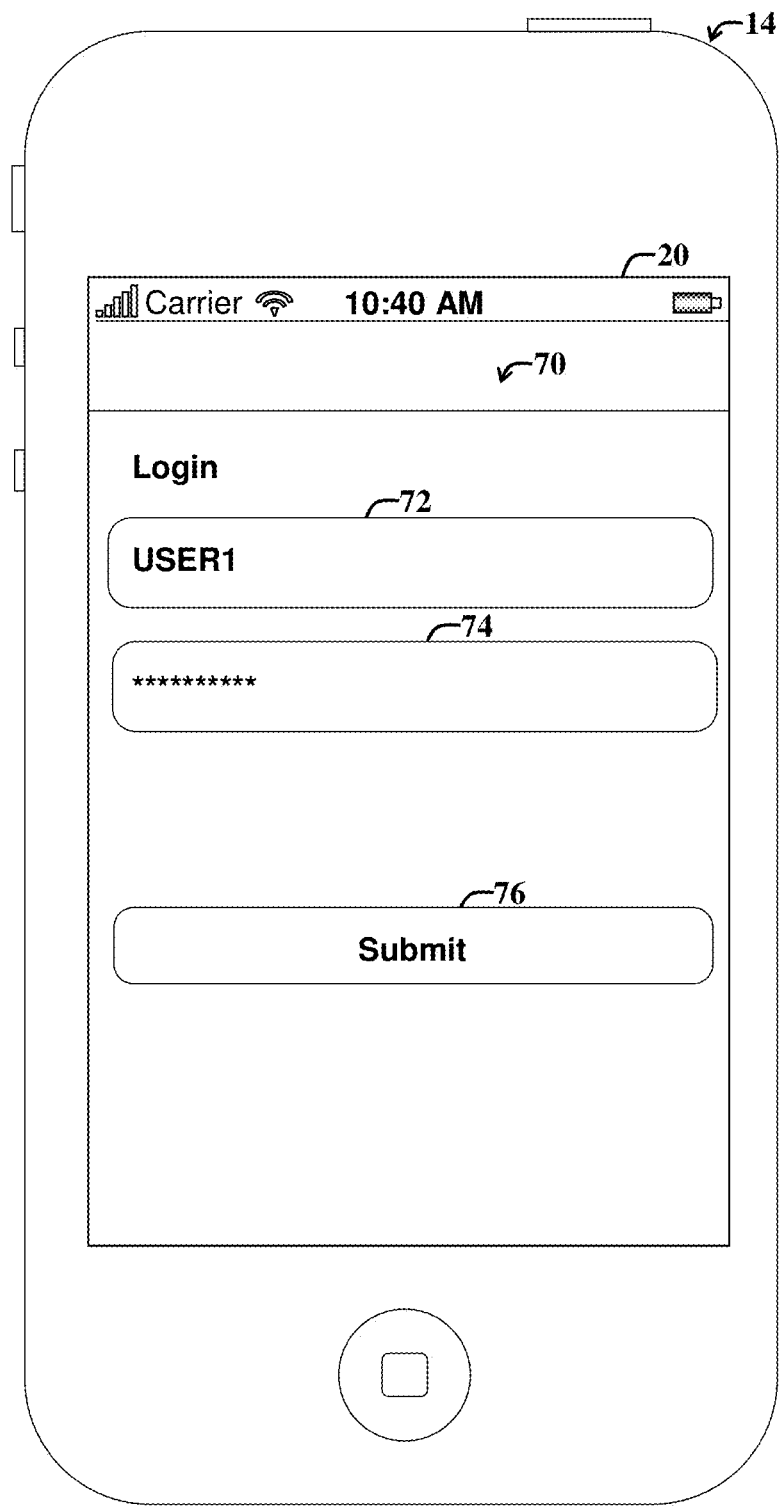
FIG. 4 is a diagram illustrating a first example user interface display screen for enabling a user to log in to the system of FIGS. 1 and 2 via the mobile computing device.

FIG. 4 is a diagram illustrating a first example user interface display screen 70 for enabling a user to log in to the system 10 of FIGS. 1 and 2 via the mobile device 14. The example login screen 70, which may be displayed via the touch screen 20, may be generated via the mobile ERP application 22 of FIG. 2 or may be generated via server-side functionality, e.g., as implemented via the ERP server system 18.

The example login screen 70 includes a user identification field 72, which represents a user interface control for enabling a user to type in a user name. A password field 74 provides a field for enabling a user to enter password information. A submit button 76 enables a user to submit the entered username and password to complete the user authentication process.

After the user has been authenticated, a screen providing various user interface controls for accessing functionality and data may appear, as discussed more fully below with reference to FIG. 5.

Figure 5:
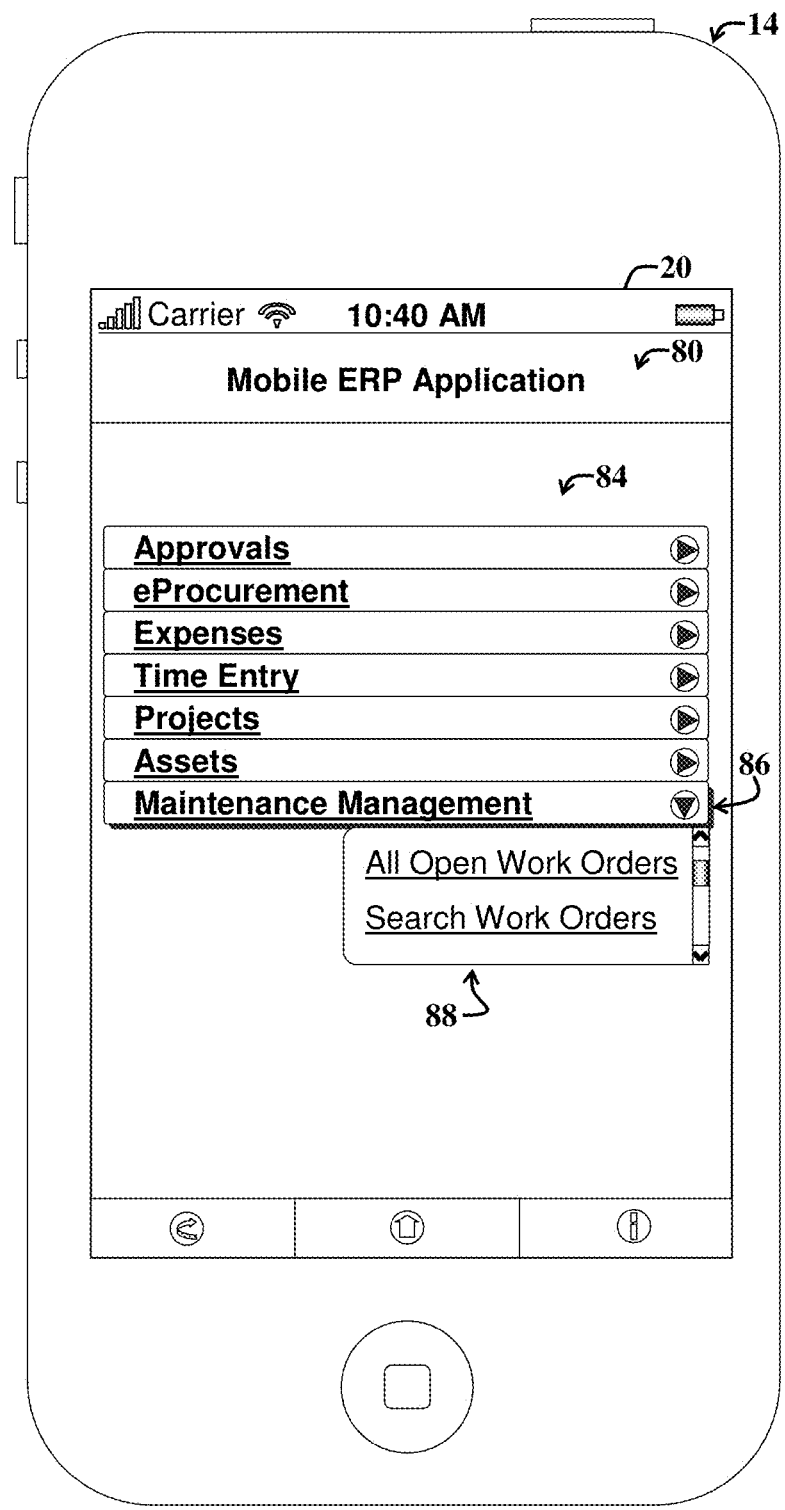
FIG. 5 is a diagram illustrating a second example user interface display screen showing ERP applications accessible via the mobile computing device of FIGS. 1 and 2.

FIG. 5 is a diagram illustrating a second example user interface display screen 80 showing various user interface controls 84 for accessing various ERP applications via the mobile device 14 of FIGS. 1 and 2. Each of the user interface controls 84 may include a drop down menu or fly out menu for providing additional user options to invoke specific ERP software and associated functionality.

For example, in the present example operative scenario, a user selects a maintenance management user interface control 86 to activate a drop down menu 88 and then access ERP maintenance management functionality. The example drop down menu 88 includes user options, implemented via hyperlinks, to open all work orders associated with the user and to search for work orders. Upon user selection of "search for work orders," a search screen may appear, as discussed more fully below with reference to FIG. 6.

Figure 6:
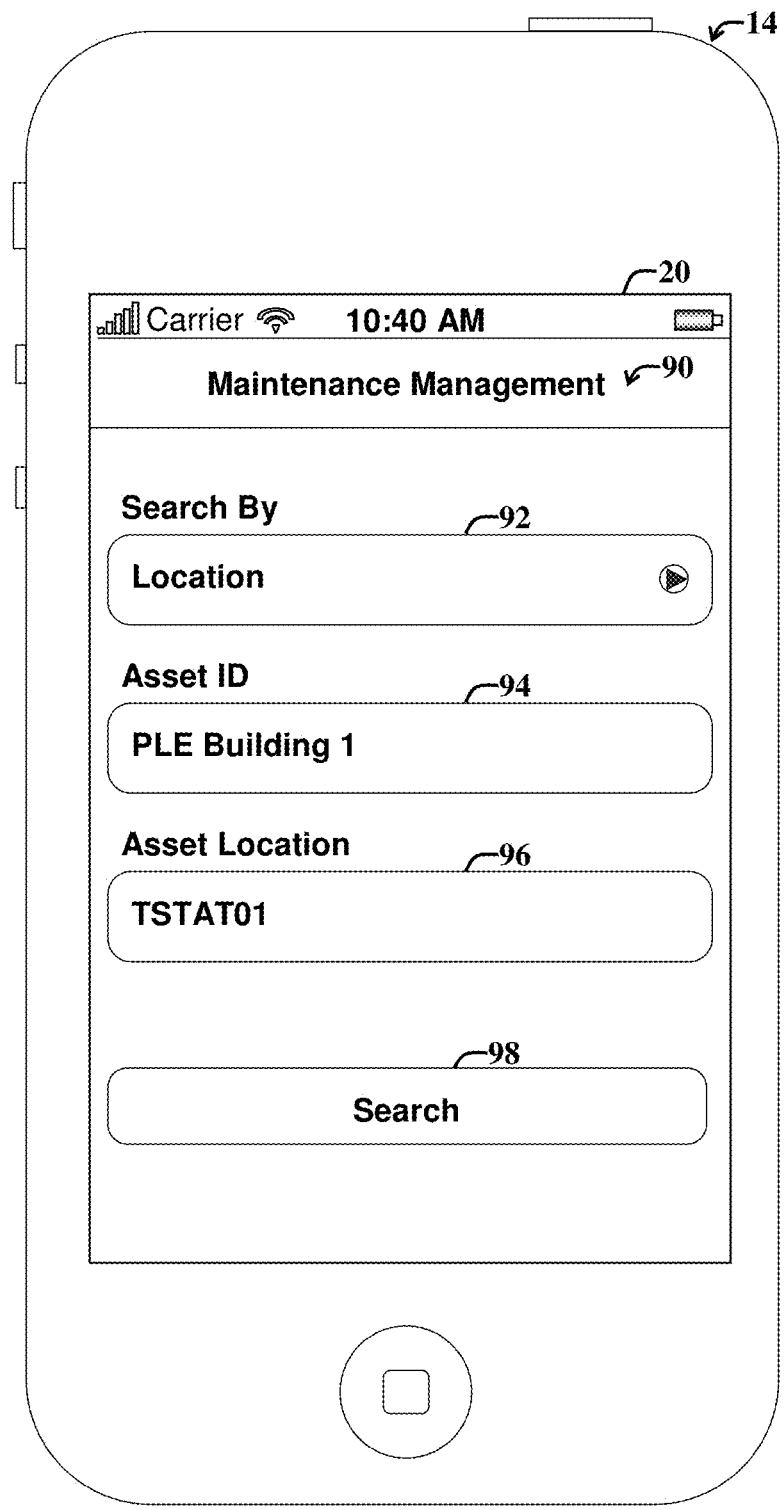
FIG. 6 is a diagram illustrating a third example user interface display screen for accessing maintenance management functionality via the mobile computing device of FIGS. 1 and 2.

FIG. 6 is a diagram illustrating a third example maintenance management user interface display screen 90 for accessing maintenance management functionality via the mobile computing device 14 of FIGS. 1 and 2. The example user interface display screen 90 includes various user interface controls 92-98 for facilitating searching for particular work orders assigned to the user.

For example, a search-by control 92 provides various user options, e.g., via a drop down menu or fly out menu, for searching by location, work order type, priority, date range, completion status, and so on. After the user selects a search-by option via the search-by control 92, an asset identification field 94 and asset location field 96 may automatically be populated. In addition, or alternatively, a user may adjust the populated fields 94, 96, such as by entering or selecting (e.g., via drop down menu) an identification number for an asset that the user wishes to search for in a given location. Alternatively, the fields 94, 96 may be left blank. Upon selection of a search button 98, values corresponding to fields 94, 96 may be automatically determined and displayed in a subsequent display screen.

In the present example operative scenario, a user leaves the asset identification field 94 blank but identifies the asset location as "PLE Building 1." Upon selection of the search button 98, a user interface display screen listing work orders in a predetermined region about PLE Building 1 may be shown, as discussed more fully below with reference to FIG. 7.

Note that the user interface display screen 90 may include additional user interface controls for providing additional user options without departing from the scope of the present teachings. For example, an option to automatically search based on a current location of the mobile device 14 (instead of based on data entered in the asset location field 96) may be provided.

Figure 7:
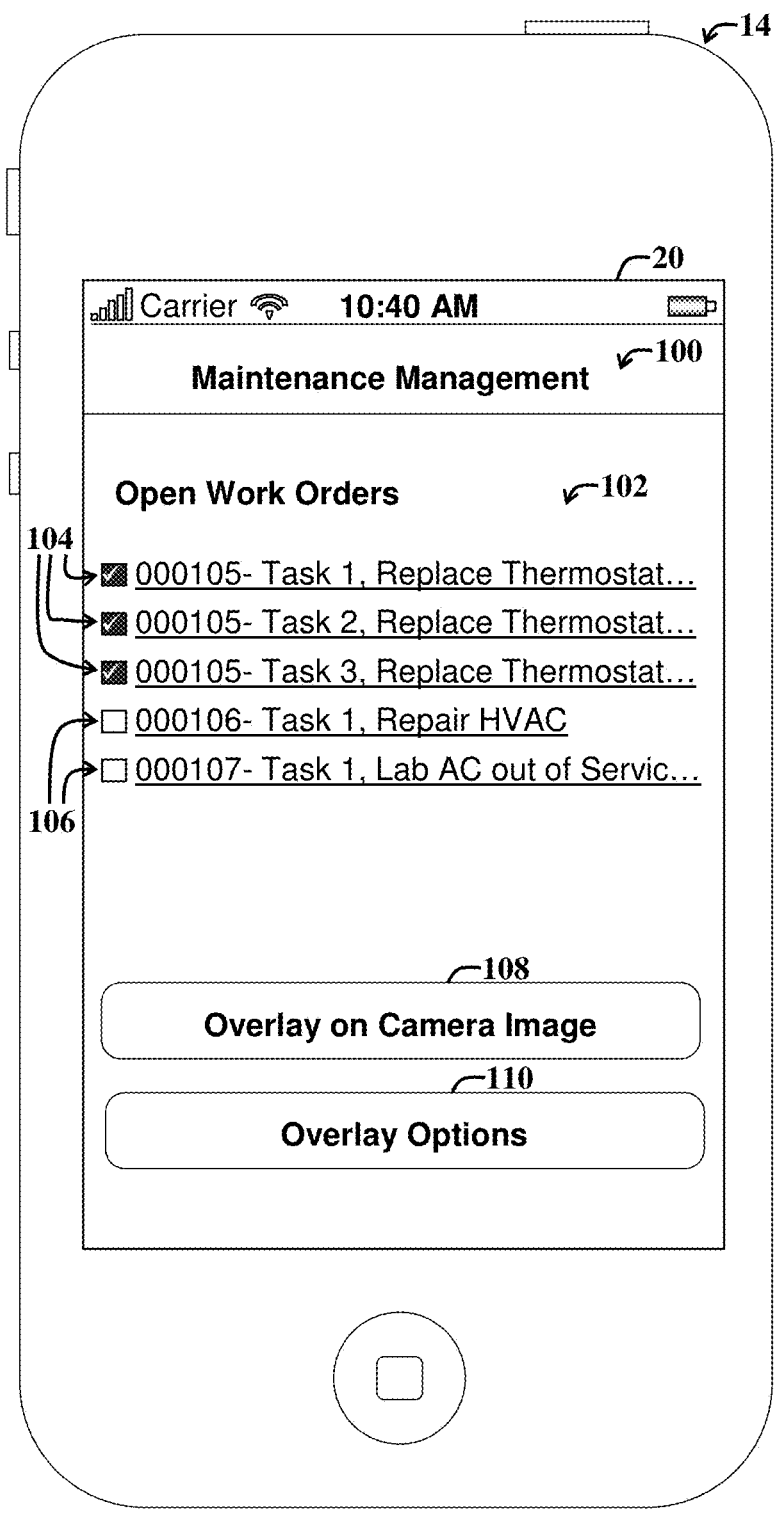
FIG. 7 is a diagram illustrating a fourth example user interface display screen for accessing maintenance management functionality via the mobile computing device of FIGS. 1 and 2.

FIG. 7 is a diagram illustrating a fourth example user interface display screen 100 for accessing maintenance management functionality via the mobile computing device 12 of FIGS. 1 and 2.

With reference to FIGS. 6 and 7, after a user has selected the search button 98 of FIG. 6, then FIG. 7 may appear showing available work orders 102 for the specified location, e.g., PLE Building 1. The search results 102 may be displayed as hyperlinks. Selection of one or more of the hyperlinks 102 pay trigger display of another user interface display screen illustrating additional work order detail and/or providing additional functionality associated with the associated work order.

In the present example operative scenario, a user has selected the first three search results 104 and has not selected the subsequent search results 106. The search results 102 and representative user interface controls may be displayed in a particular order, e.g., in accordance with a degree to which a search result matches previously specified search criteria.

The user has selected the first three selected matching search results 104 that match all criteria specified via the third user interface display screen 90 of FIG. 6. Note that in an illustrative embodiment, the listed search results 102 may be highlighted or augmented with one or more visual indications indicating a degree to which the search results match selected search criteria.

A user may select various search results 104 and then select an overlay user interface control 108 to overlay associated user interface controls and/or accompanying identification information on a camera image. Note that to view additional wording describing each search result 102, a user may rotate the mobile device 104 or use a side swipe finger motion across the touch screen 20.

An optional user interface control 110 provides a user option to configure overlay options 110 prior to overlaying representations of work orders on a camera image to be viewed via the touch screen 20.

Figure 8:
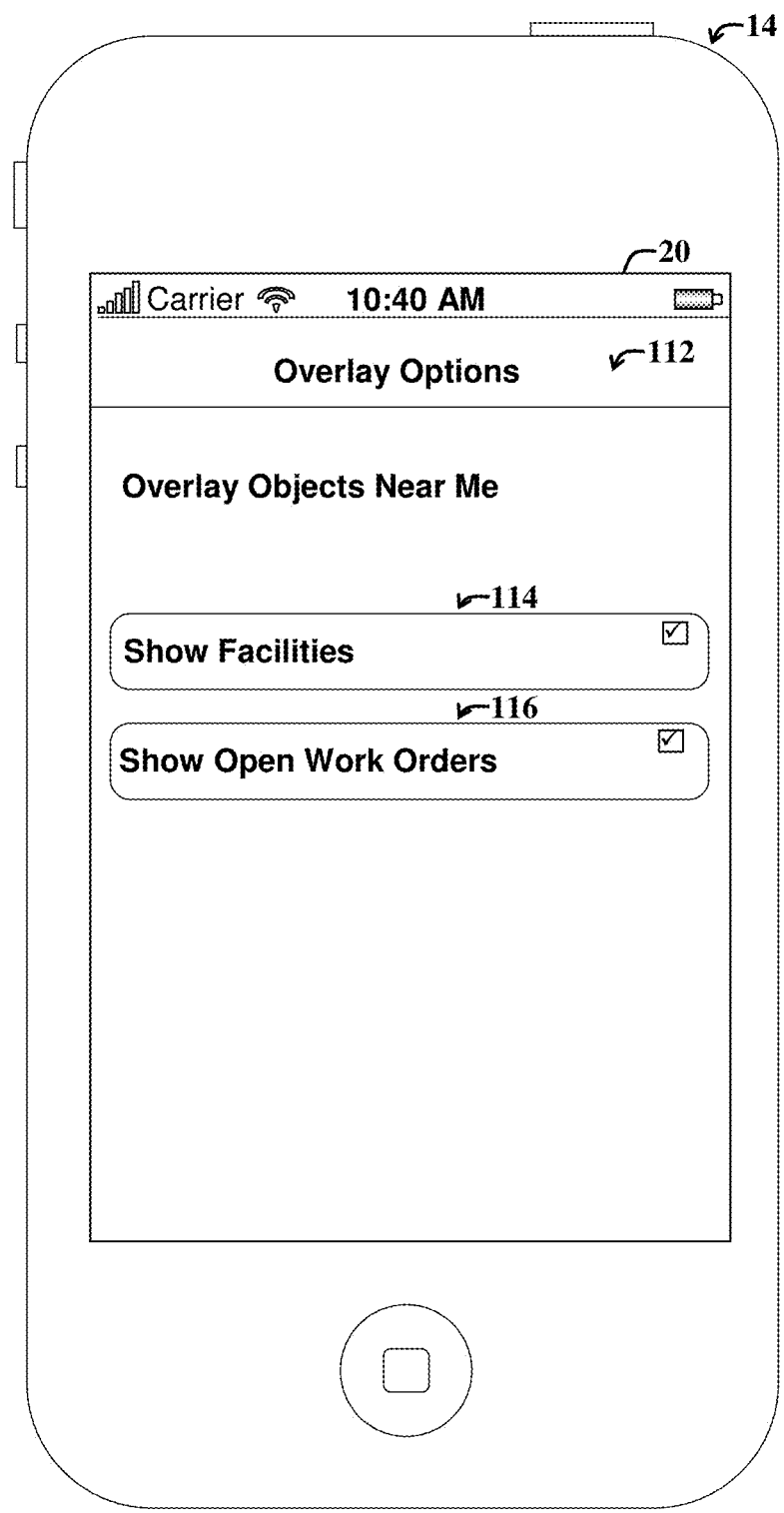
FIG. 8 is a diagram illustrating a fifth example user interface display screen for enabling user adjustment of data and functionality to be overlaid on imagery obtained via the mobile computing device of FIGS. 1-2.

FIG. 8 is a diagram illustrating a fifth example user interface display screen 112 that provides various overlay options for enabling user adjustment of and/or filtering of data and functionality to be overlaid on imagery obtained via the mobile device 14 of FIGS. 1-2.

A show-facilities user interface control 114 includes a checkbox for enabling a user to overlay bubbles or other controls on an image for accessing information about buildings appearing in a camera image as viewed through the touch screen 20. A show-open-work-orders control 116 provides a user option to augment a camera image with user interface controls, such as wrench icons, that indicate and/or provide access to information and/or functionality associated with open work orders assigned to the user. Various user interface controls overlaid on a camera image may be positioned on the camera image to coincide with the actual location at which work associated with a work order is to be performed.

The user options 114, 116 and accompanying user interface controls 114, 116 may enable togging of location based information for other work orders that were not selected in the user interface display screen 100 of FIG. 7, such that anytime a facility came into the view of the camera of the mobile device 14, it could be identified. Furthermore, the user interface display screen 112 and accompanying user interface controls 114, 116 could be set to show additional work orders, other than those selected, which are near the user in the field. These work orders could show as a different color place marker, for example, red instead of blue. Alternatively, the user interface controls 114, 116 may only apply to previously selected work orders and buildings associated therewith.

Figure 9:
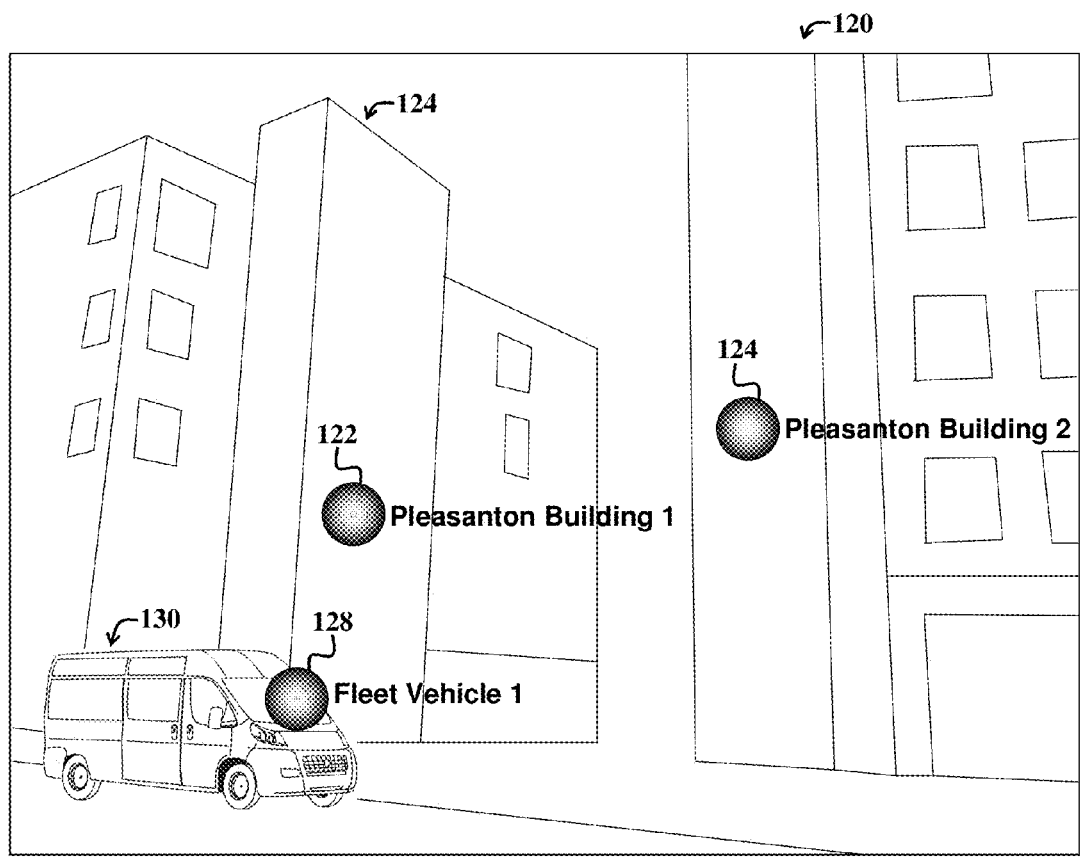
FIG. 9 is a diagram illustrating a sixth example user interface display screen with augmented data and functionality overlaid on imagery obtained via a camera of the mobile computing device of FIGS. 1-2.

FIG. 9 is a diagram illustrating a sixth example user interface display screen 120 with augmented data and accompanying user interface controls 122, 124, 128 overlaid on imagery obtained via a camera of the mobile device 14 of FIGS. 1-2.

With reference to FIGS. 2 and 9, the image shown on user interface display screen 120 represents a view through a camera of the mobile device 14, as displayed via the touch screen 20 of the mobile device 14 of FIG. 2. A user may move the camera to pan side to side and up and down. A GPS receiver, camera, gyroscope, and compass can facilitate pinpointing the user's location and orientation, which may then be used to facilitate identifying buildings in view of the camera of the mobile device 14.

The imagery of the user interface display screen 120, which represents a view of a portion of a corporate campus, is augmented via the example user interface controls 122, 124, 128. The user interface controls 122, 124, 128 include a first user selectable bubble or icon 122 identifying Pleasanton Building 1, a second user selectable bubble or icon 124 identifying Pleasanton Building 2, and a third user selectable bubble or icon 128 identifying a fleet vehicle 130.

Using the touch screen 20 on the mobile device 14, the user may select one or more of the bubbles 122, 124, 128 to view additional information pertaining to the underlying facility or asset, e.g., as stored in the ERPs real estate management module 34 or asset management module 34.

Figure 10:
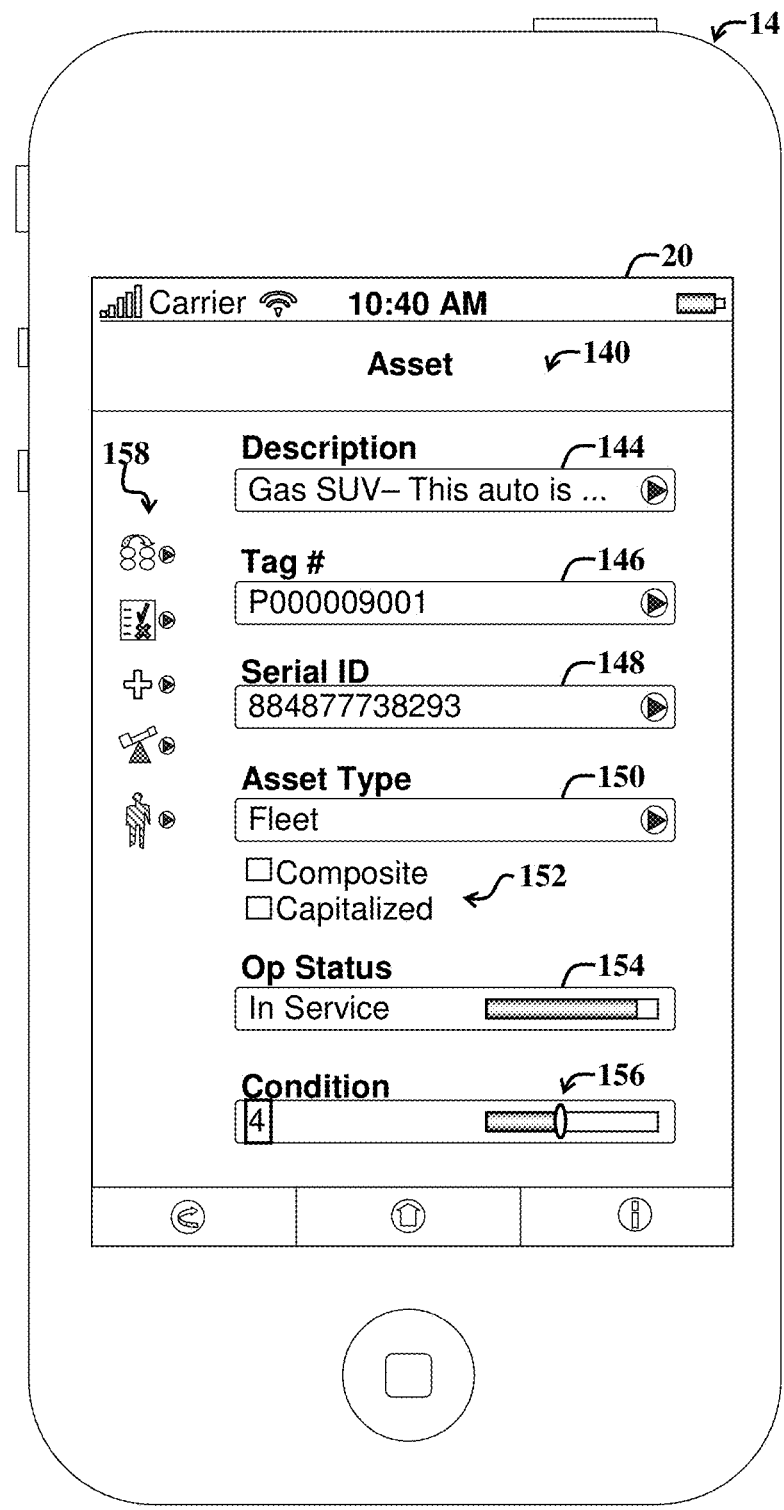
FIG. 10 is a diagram illustrating a seventh example user interface display screen for accessing and interacting with a computing object associated with an asset identified in the imagery of FIG. 9.

FIG. 10 is a diagram illustrating a seventh example user interface display screen 140 for accessing and interacting with a computing object associated with an asset 130 (i.e., fleet vehicle) identified in the imagery of FIG. 9. The user interface display screen 140 and accompanying user interface controls 144-158 may be generated via the mobile ERP application 22 of FIG. 2 in response to user selection of the fleet vehicle bubble 130 of FIG. 9.

The seventh example user interface display screen 140 includes a description section 144, which describes the asset; a tag number section 146 identifying a tag number associated with the asset; a serial number field 148 identifying a serial number of the asset; a fleet-type selection control 150 for providing a user option to identify and to change a type category for the asset; additional asset descriptions 152; an operation status indicator 154, and an asset condition adjustable slider 156. A list of links, buttons, or other user interface controls 158 may provide various user options for accessing additional ERP applications and associated functionality.

The user could select a back button or return button on the mobile device 14 return focus to the camera view. In addition to a bubble for an asset, users may also view wrench icons and/or other types of user interface controls for facilitating accessing any previously selected work orders (and for interacting with associated computing objects) that exist in a building within view of the camera of the mobile device 14. The wrench icons could be displayed, by floor of the building, if the building were multiple floors, as discussed more fully below with reference to FIG. 11.

Figure 11:
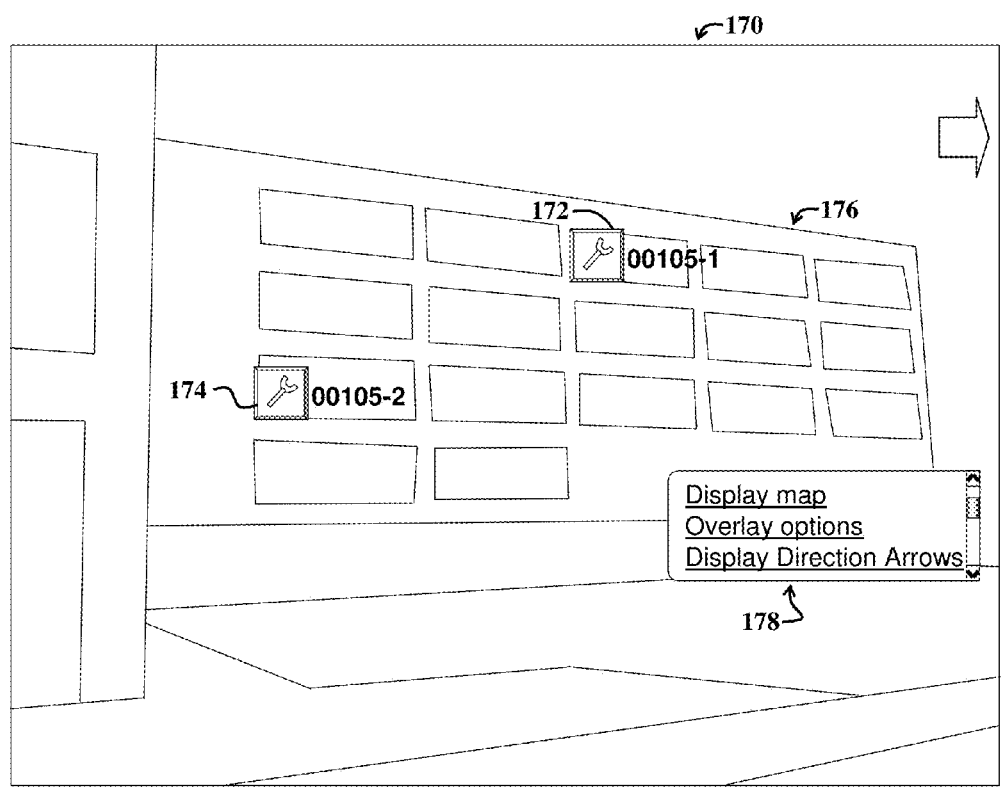
FIG. 11 is a diagram illustrating an eighth example user interface display screen showing camera imagery of the mobile computing device of FIGS. 1 and 2, wherein the camera imagery is augmented with user interface controls identifying locations of work orders to be completed by a user.

FIG. 11 is a diagram illustrating an eighth example user interface display screen 170 showing camera imagery of the mobile device 14 of FIGS. 1 and 2, wherein the camera imagery is augmented with user interface controls 172, 174 identifying locations of work orders to be completed by a user in a building 176.

In the present example embodiment, the user interface controls 172, 174 are wrench icons, which are labeled with a work order number, and which are overlaid on different floors of the building 176 in accordance with where each work order or portion thereof is to be addressed.

Hence, in the present example, the user can see two work order tasks that are waiting to be completed in the building 176 at the locations indicated by the overlaid wrench icons 172, 174. A third selected work order, e.g., as shown in the user interface display screen 100 of FIG. 7, is not visibly overlaid, as it is not in the area captured by the camera image. The user may select a wrench icon 172, 174 to trigger display of additional details corresponding to work order associated with the selected wrench icon 172, 174.

In practice, the user could also update information pertaining to the work order associated with the selected wrench icon 172, 174 directly via a user interface display screen associated with the work order, as discussed more fully below. For example, the status of a particular work order may be set to "in progress," as discussed more fully below with reference to FIG. 13. The adjustments may then be saved, e.g., by selecting a save button, which may update the computing object associated with the work order as stored via the mobile ERP application 22 and/or back end ERP system 18 of FIG. 2.

An optional hover layer 178 may be overlaid on the display screen 170, e.g., in response to a tap and hold (or other known mechanism, such as double tap) on the associated touch screen. The hover layer 178 may provide various user options, e.g., to display directional arrows indicating which direction to pan the camera to view wrench icons associated with other work orders; to display open work orders on an overview map; to access a configuration screen to configure additional overlay options; and so on.

Figure 12:
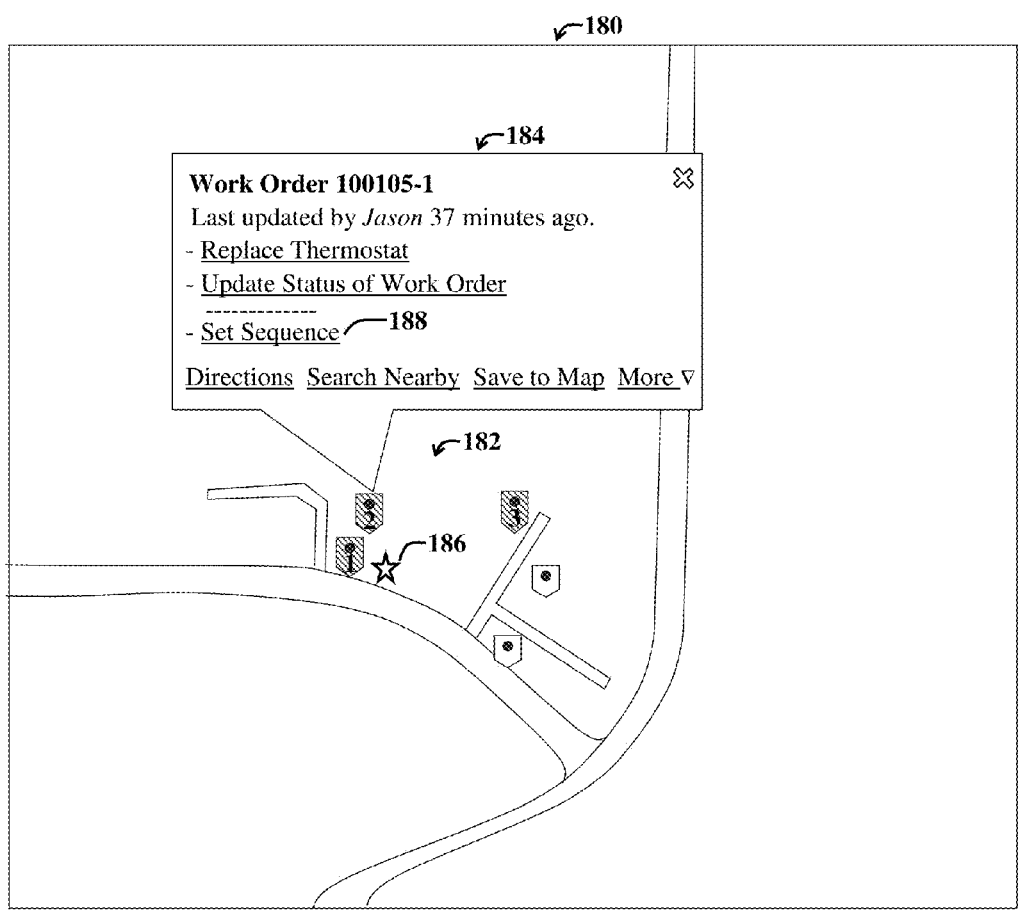
FIG. 12 is a diagram illustrating a ninth example user interface display screen displayable via the mobile computing device of FIGS. 1-2 and showing an overview map detailing locations of work orders in proximity to a user.

FIG. 12 is a diagram illustrating a ninth example user interface display screen 180 displayable via the mobile device 14 of FIGS. 1-2 and showing an overview map detailing locations of work orders 182 in proximity to a user location 186. Representations of various work orders 182 may be color coded according to status, and may be numbered in accordance with a sequence in which the work orders are to be performed.

Selection of a work order icon 182 may trigger display of a callout 184, which may provide associated information and user interface controls for accessing functionality associated with the work order. For example, a set-sequence user interface control 188 provided in the callout section 184 provides a hyperlink, which a user may select to trigger display of another user interface display screen for enabling a user to order, i.e., sequence, the order in which the tasks are to be performed. For example, a user option to sequence tasks based on the shortest round trip travel distance between tasks may be selected. Alternatively, or in addition, user options for manually establishing a preferred work order sequence may also be provided. Furthermore, user options for employing a software algorithm to determine an optimal sequence based on one or more predetermined parameters may be provided.

Note that the callout 184 may provide additional user interface options, such as an option to display only open work orders within a user specified radius of the user, without departing from the scope of the present teachings.

Hence, the overview map of the user interface display screen 180 may facilitate user access to detailed information about each work order, including sequencing information, relative location, and so on. As the user completes each work order, the next in sequence could become the active work order, which may be highlighted on the overview map of the user interface display screen 180. As the user saves a completed work order, the underlying the application (e.g., mobile ERP application 22 of FIG. 2), could automatically direct the user, e.g., via on screen directional arrows, to the next sequenced work order.

Figure 13:
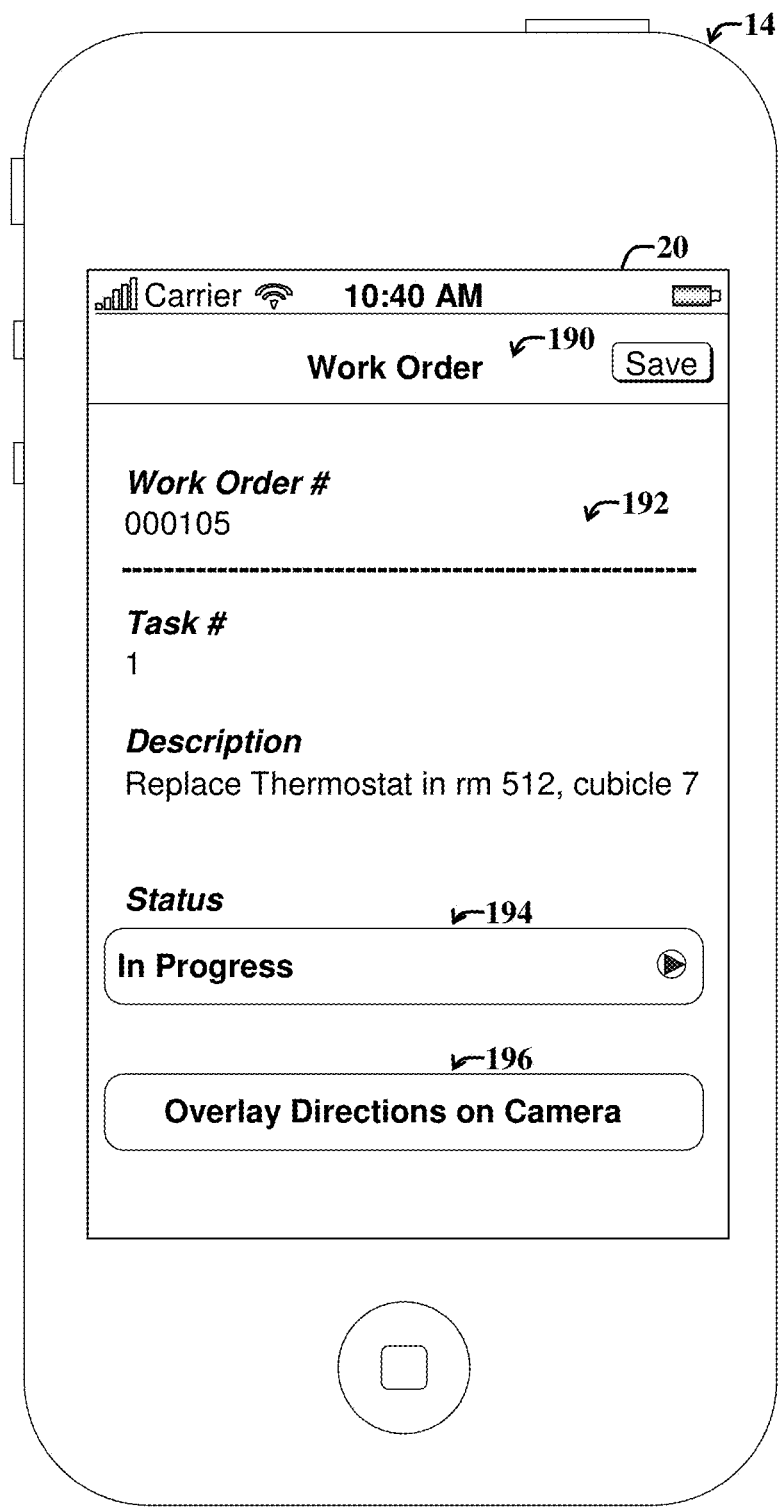
FIG. 13 is a diagram illustrating a tenth example user interface display screen for accessing work order functionality via the mobile computing device of FIGS. 1 and 2.

FIG. 13 is a diagram illustrating a tenth example user interface display screen 190 for accessing work order functionality via the mobile device 14 of FIGS. 1 and 2. The tenth example user interface display screen 190 represents an example screen associated with a particular work order. Identification information 192 may describe the work order. A status user interface control 194 provides user options for adjusting a status of the work order. An overlay directions control 196 represents a user option to trigger display of directions, e.g., via directional arrows on a camera image of the mobile device 14, as discussed more fully below with reference to FIGS. 14-15.

The tenth user interface display screen 190 may be panned to the right by using the common swipe gesture to show other tasks for the work order. Additional fields could also be added.

When the user selects the overlay directions control 196, directions to a work order location are overlaid on camera imagery. The overlaid directions may facilitate directing a user within a building and/or as the user approaches the building associated with the work order. The user, for example, could have work orders on the fifth floor of an office building. Once the user exits the elevators he or she could scan a QR code in the common area outside of the elevators that could identify which floor he or she is on. Alternatively, or in addition to use of QR codes, other environmental features (e.g., posted floor maps, artwork fixtures, and so on), the locations of which are known and previously registered (e.g., with the ERP system 18 of FIG. 2), may be scanned to facilitate identifying which floor the user is on.

Figure 14:
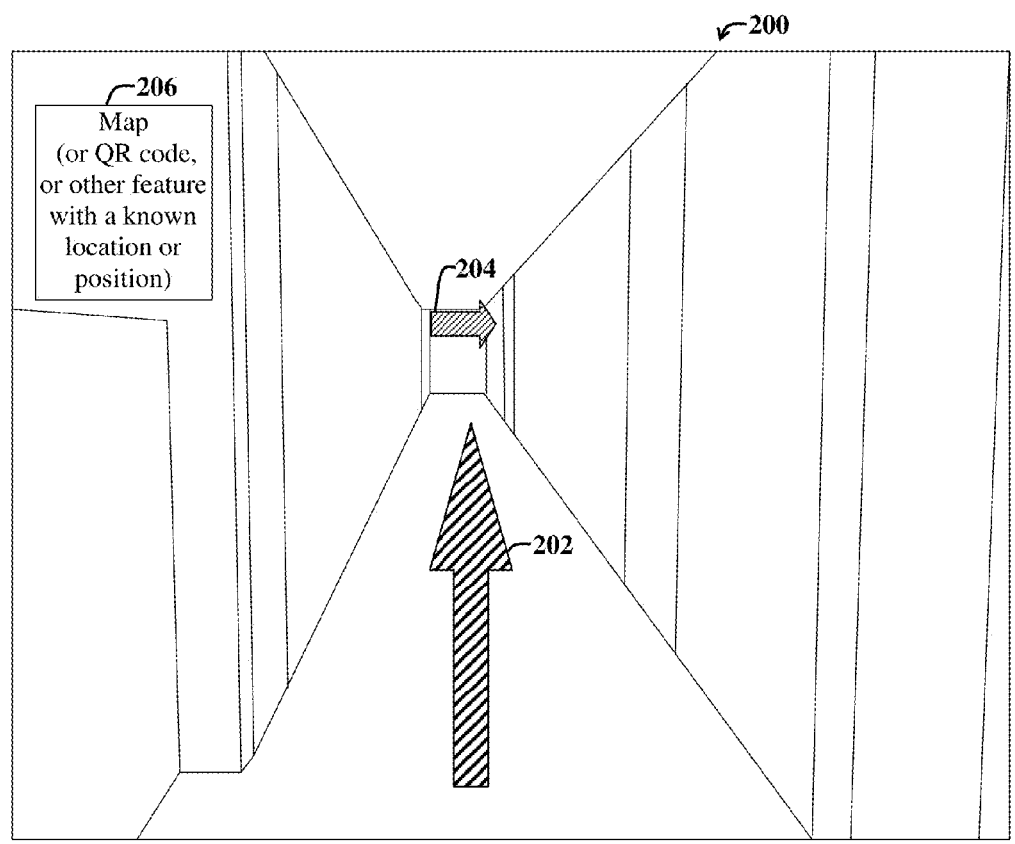
FIG. 14 is a diagram illustrating an eleventh example user interface display screen, which includes imagery augmented with directions to a location associated with the work order detailed in the tenth example user interface display screen of FIG. 13.

FIG. 14 is a diagram illustrating an eleventh example user interface display screen 200, which includes imagery augmented with directions 202, 204 to a location associated with the work order detailed in the ninth example user interface display screen of FIG. 13.

A map, QR code, or other feature 206 may be scanned, as discussed above, to facilitate further resolving or refining device location information, e.g., refining device location to the extent that the ERP system 18 and mobile application 22 can determine which floor a user is on.

The map 206 may be augmented with a QR code to allow the map 206 to be scanned, identified, and uploaded to the mobile device 14 to further facilitate providing directions to a work order destination location.

The floor information coupled with the input from the mobile device 14 facilitates augmentation of reality with the directional arrows 202, 204, directing the user to the room that requires, for example, thermostat replacement. The arrows 202, 204 may be displayed directly on the touch screen 20 mobile device 14, and may change as the user pans the mobile device 14, directing the user when to go straight or make turns within the corridors of the office floor.

As the destination room becomes visible, the image from the mobile device 14 is then augmented via a star icon 212 pinpointing the location associated with the work order.

Figure 15:
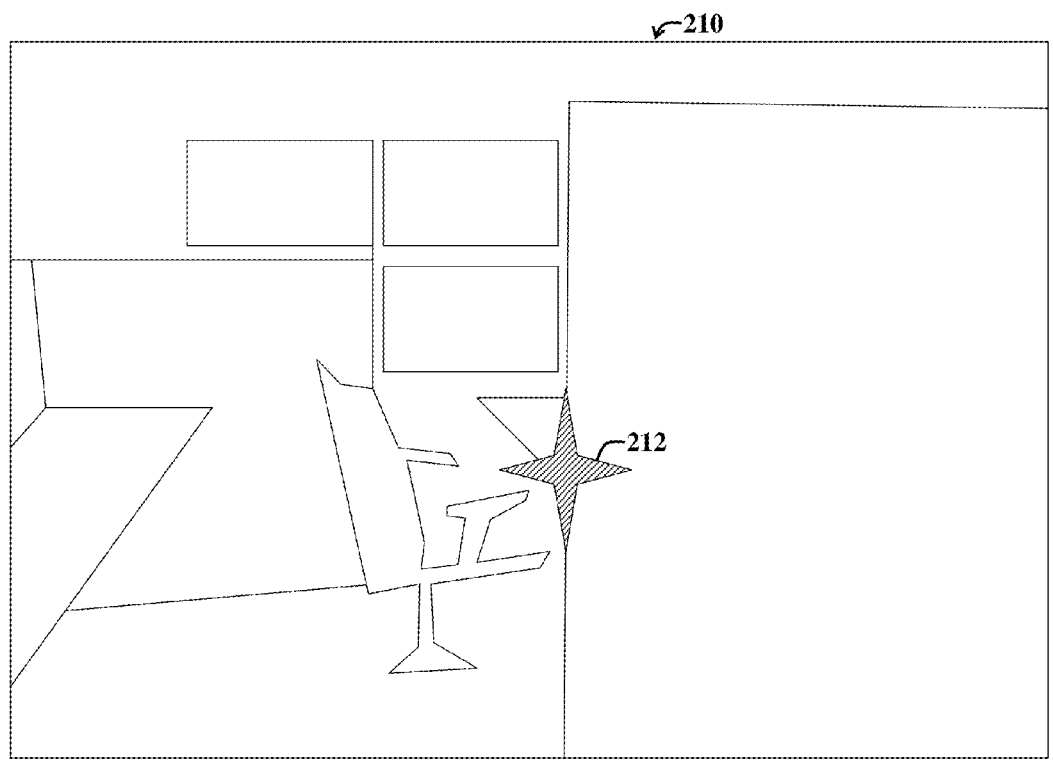
FIG. 15 is a diagram illustrating a twelfth example user interface display screen, which includes imagery augmented with a location identifier that identifies a specific location associated with a work order.

FIG. 15 is a diagram illustrating a twelfth example user interface display screen 15, which includes imagery augmented with a location identifier, i.e., star icon 212, that identifies a specific location associated with a work order.

Previously, without aid of embodiments disclosed herein, workers lacked assistance in locating specific areas that pertained to relevant work orders. Furthermore workers would have to manually navigate to work order information via a laptop or other connected device, or even printed work orders. Workers would need to identify the work order by number or description; download access manuals, and so on. The worker would also likely need to consult a map of the corporate campus to identify his or her location as well as the location of the pending work. Various embodiments discussed herein may obviate the need to perform such potentially inefficient and time consuming tasks.

Figure 16:
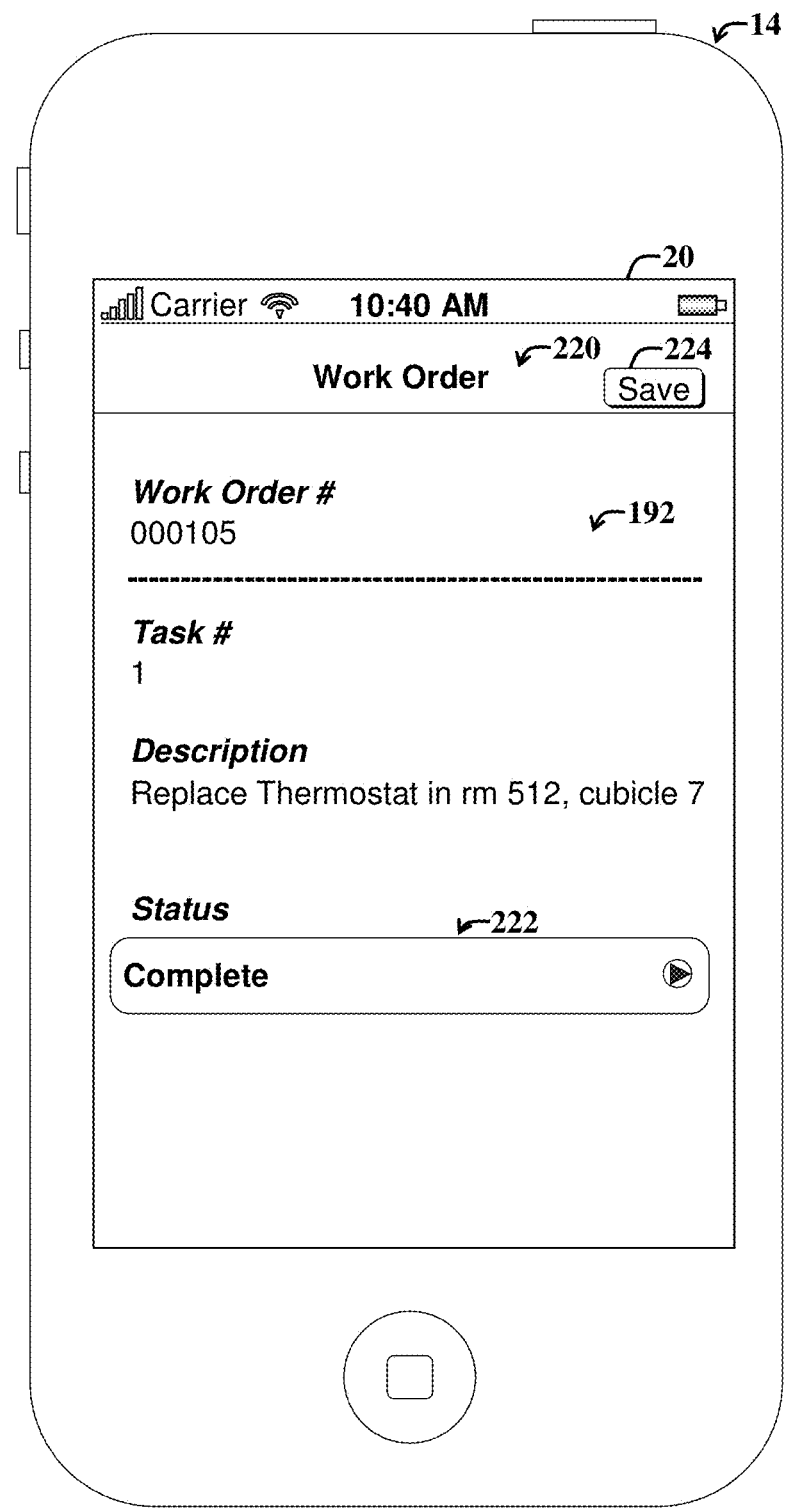
FIG. 16 is a diagram illustrating a thirteenth example user interface display screen for accessing work order functionality, which may appear on the mobile computing device of FIGS. 1-2 after a user has reached a specific location associated with a work order.

After completion of a work order at the identified location 212, a user may press a back button or employ functionality provided via a hover layer menu accessible via the display screen 210 to return to a work order user interface display screen, as shown in FIG. 16.

FIG. 16 is a diagram illustrating a thirteenth example user interface display screen 220 for accessing work order functionality, which may appear on the mobile device 14 of FIGS. 1-2 after a user has reached a specific location associated with a work order.

A user employs a status user interface control 222 to update the status of the work order to complete. The change may then be saved, e.g., by selecting a save button 224, thereby updating the ERP system 18 of FIG. 2.

If there are other work orders to complete, the user could either use the mobile's back or return button to return to a user interface display screen (e.g., the ninth display screen 90 of FIG. 6 or the fourteenth display screen 230 of FIG. 17) to open and/or search for work orders. Alternatively, an additional "return to search" button may be provided in the user interface displays screen 220 to facilitate returning to a previous display screen.

Figure 17:
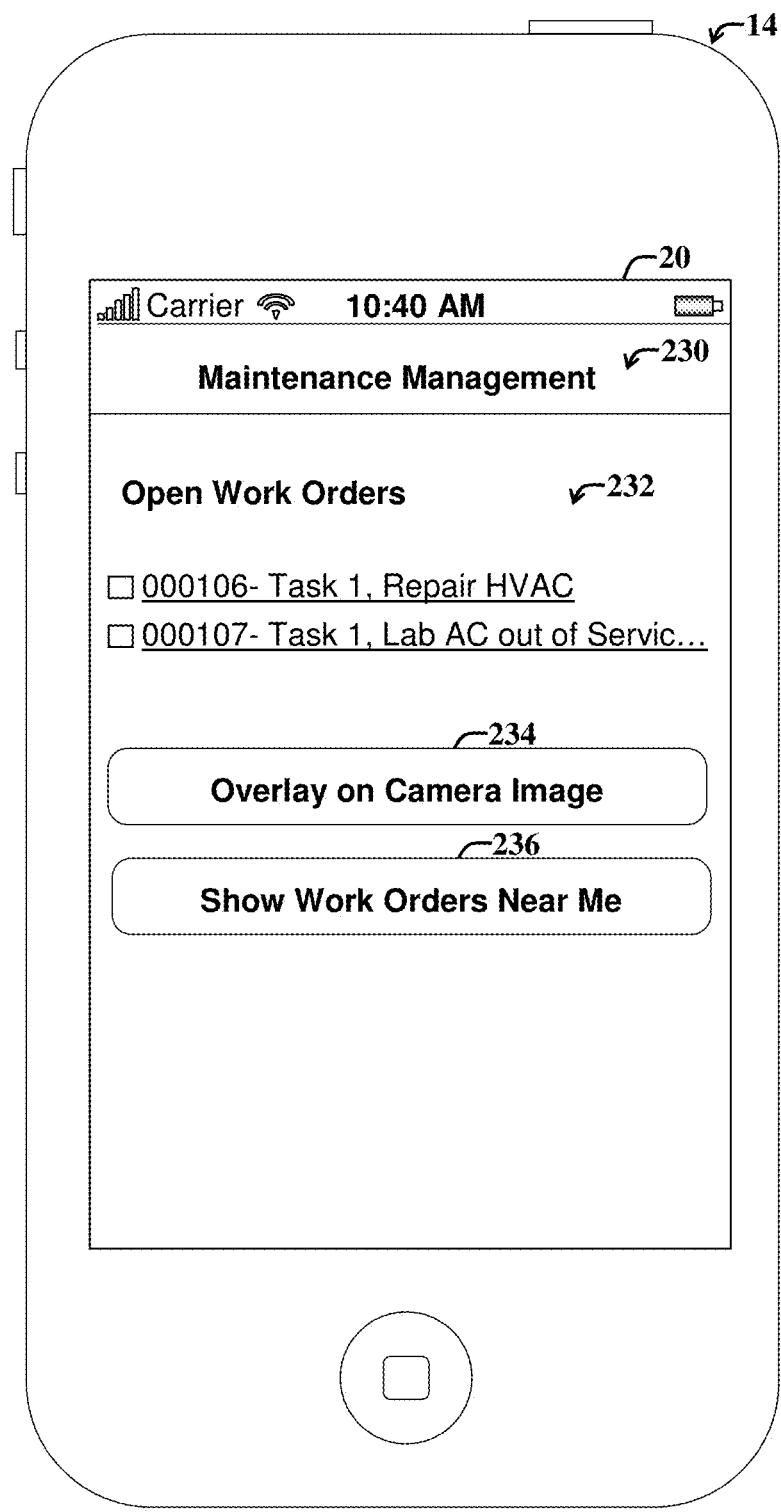
FIG. 17 is a diagram illustrating a fourteenth example user interface display screen for accessing maintenance management functionality, including viewing open work orders, via the mobile computing device of FIGS. 1 and 2.

Alternatively, after a work order is completed and saved, the underlying application (e.g., mobile ERP application 22 of FIG. 2) automatically reverts to displaying an open work order screen, e.g., the fourteenth user interface displays screen 230 of FIG. 17.

FIG. 17 is a diagram illustrating a fourteenth example user interface display screen 230 for accessing maintenance management functionality, including viewing open work orders, via the mobile device 14 of FIGS. 1 and 2.

The example user interface display screen 230 includes a listing of hyperlinks corresponding to remaining open work orders 232, a user option 234 to overlay representations of the remaining work orders on a camera image, and an option 236 to show work orders within a predetermined range of the location of the user, e.g., via an overview map.

Figure 18:
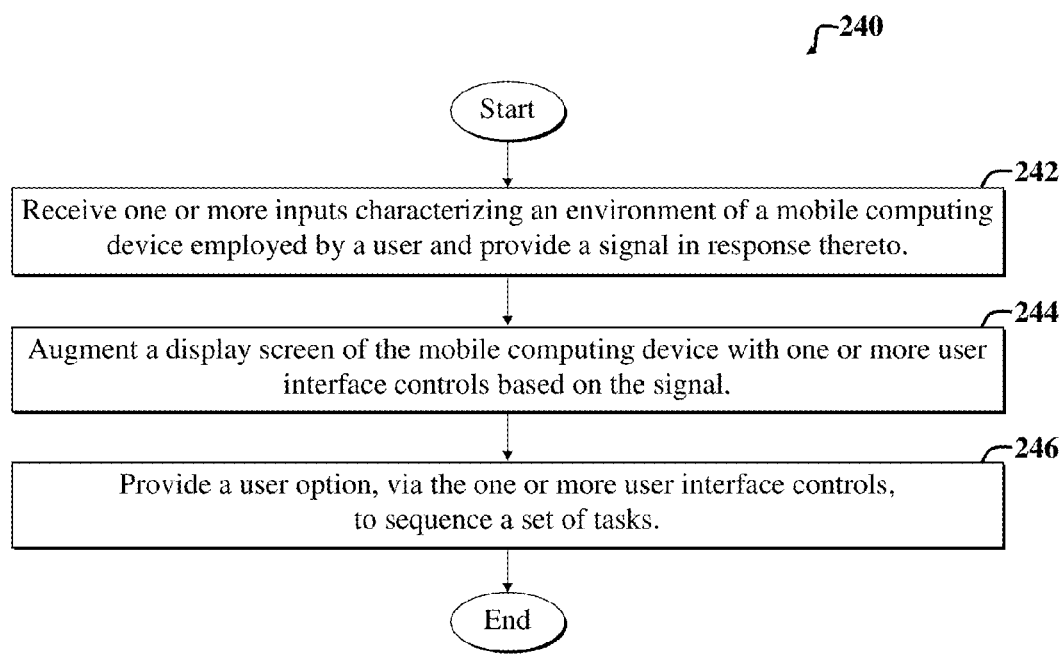
FIG. 18 is a flow diagram of an example method, which may be implemented via the embodiments of FIGS. 1-17.

FIG. 18 is a flow diagram of an example method 240, which may be implemented via the embodiments of FIGS. 1-17. The method 240 includes a first step 242, which involves receiving one or more inputs characterizing an environment of a mobile device employed by a user and providing a signal in response thereto.

A second step 244 includes augmenting a display screen of the mobile device with one or more user interface controls based on the signal.

A third step 246 includes providing a user option, via the one or more user interface controls, to sequence a set of tasks.

Note that various steps 242-246 of the method 240 may be adjusted, changed, or replaced, without departing from the scope of the present teachings. For example, the third step 246 may be replaced with a step that includes providing a first user option, via the one or more user interface controls, to interact with a computing object that includes enterprise data, such as pending work orders, associated with the user.

A more detailed alternative method includes identifying a location of a mobile device, e.g., via GPS coordinates, camera imagery, and so on; then identifying an orientation of the mobile device, e.g., via a gyroscope, compass, and so on; then retrieving computing object containing enterprise data; and then providing a user option to interact with the computing object (e.g., update data, access functions, etc.).

Hence, certain embodiments discussed herein employ representations of reality, e.g., camera imagery, as captured via a mobile device, and then provide information that is applicable to the user, directly to the user. This may obviate the need to print, locate, or scan QR codes. Furthermore, certain embodiments discussed herein enable real time access to enterprise information so workers do not need to carry manuals or asset descriptions. Furthermore enterprise personnel can now interact directly with an ERP system via a mobile device after an asset or work order has been identified.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method, performed by a processing system on a mobile computing device having a display screen and one or more sensors, for employing augmented reality in an enterprise computing environment of an enterprise, the method comprising:

receiving location-identification information at the mobile computing device;

processing the location-identification information to determine location information specifying the location of the mobile computing device;

obtaining environmental data related to the location using the one or more sensors;

processing the location information and the environmental data to resolve a financial location of the enterprise, where the financial location is a physical location associated with enterprise data;

matching input image data provided by a sensor with image data associated with a task to be performed at the financial location; and selectively augmenting an image, based on the image data, displayed on the display screen of the mobile computing device with one or more user interface controls related to the task to be performed.

2. The method of claim 1 wherein the image data is matched with a set of tasks to be performed by a user.

3. The method of claim 2 wherein the set of tasks includes traveling to a location at which of a work order is to be performed and performing the work order.

4. The method of claim 3 wherein the set of tasks includes multiple work orders slated to be performed in a particular order.

5. The method of claim 3 wherein selectively augmenting further includes providing a first user interface control adapted to enable a user to access data pertaining to the work order and to adjust stored data associated with the work order, wherein the stored data includes data indicating a status of the work order.

6. The method of claim 5 further including positioning the first user interface control on an image, displayed on the display screen of the mobile computing device, at a portion of the image corresponding to the location at which the work order is to be performed.

7. The method of claim 6 wherein the image includes an image of a building, and wherein the first user interface control is overlaid on the image of the building at a specific floor corresponding to the location at which the work order is to be performed.

8. The method of claim 2 wherein environmental data includes image data input via a camera in communication with the mobile computing device.

9. The method of claim 8 further including matching one or more images included in the image data with previously stored image data to facilitate identifying an entity in an environment surrounding a user of the mobile computing device.

10. The method of claim 9 further including refining a determined location and orientation of the mobile computing device based on a known location of the enterprise.

11. The method of claim 10 wherein selectively augmenting further includes overlaying a user interface control on the one or more images, wherein the user interface control is adapted to enable a user to access a computing object associated with a task.

12. The method of claim 2 further including:

displaying one or more representations of tasks of the set of tasks on a map characterizing the location of the mobile computing device.

13. The method of claim 1 further including receiving orientation information characterizing an orientation of the mobile computing device.

14. The method of claim 13 further including using a GPS receiver in communication with the mobile computing device to provide location-identification information.

15. The method of claim 13 further including using a compass in communication with the mobile computing device to provide orientation information.

16. The method of claim 13 further including using a gyroscope in communication with the mobile computing device to provide orientation information.

17. The method of claim 13 further including using location information and orientation information to track movement of a user in an environment and augmenting an image displayed on the display screen of the mobile computing device with directions to a particular location associated with one or more tasks of the set of tasks in response to a current position of a user in the environment.

18. An a mobile computing device having a display screen and one or more sensors comprising:

a digital processor coupled to the display screen and to a non-transitory processor-readable storage device, wherein the non-transitory processor-readable storage device includes one or more instructions executable by the digital processor to perform the following acts:

receiving location-identification information at the mobile computing device;

processing the location-identification information to determine location information specifying the location of the mobile computing device;

obtaining environmental data related to the location using the one or more sensors;

processing the location information and the environmental data to resolve a financial location of the enterprise, where the financial location is a physical location associated with enterprise data;

matching input image data provided by a sensor with image data associated with a task to be performed at the financial location; and selectively augmenting an image, based on the image data, displayed on the display screen of the mobile computing device with one or more user interface controls related to the task to be performed.

19. A non-transitory processor-readable storage device including instructions executable by a digital processor, the non-transitory processor-readable storage device including one or more instructions for:

receiving location-identification information at a mobile computing device having a display screen and one or more sensors;

processing the location-identification information to determine location information specifying the location of the mobile computing device;

obtaining environmental data related to the location using the one or more sensors;

processing the location information and the environmental data to resolve a financial location of the enterprise, where the financial location is a physical location associated with enterprise data;

matching input image data provided by a sensor with image data associated with a task to be performed at the financial location; and selectively augmenting an image, based on the image data, displayed on the display screen of the mobile computing device with one or more user interface controls related to the task to be performed.

* * * * *

UNITED STATES PATENT AND TRADEMARK OFFICE
CERTIFICATE OF CORRECTION

| | | |
|---|---|---|
| PATENT NO. | : 8,761,811 B2 | Page 1 of 1 |
| APPLICATION NO. | : 13/458870 | |
| DATED | : June 24, 2014 | |
| INVENTOR(S) | : Alonzo | |

It is certified that error appears in the above-identified patent and that said Letters Patent is hereby corrected as shown below:

In the Specification

Column 1, line 31, delete "and or" and insert -- and/or --, therefor.

In the Claims

Column 17, line 26, in Claim 3, after "which" delete "of".

Column 18, line 19, in Claim 18, delete "An a" and insert -- A --, therefor.

Signed and Sealed this
Twenty-fourth Day of February, 2015

Michelle K. Lee
*Deputy Director of the United States Patent and Trademark Office*